W. A. BERNARD.
HAND TOOL.
APPLICATION FILED FEB. 28, 1921.
1,407,780. Patented Feb. 28, 1922.
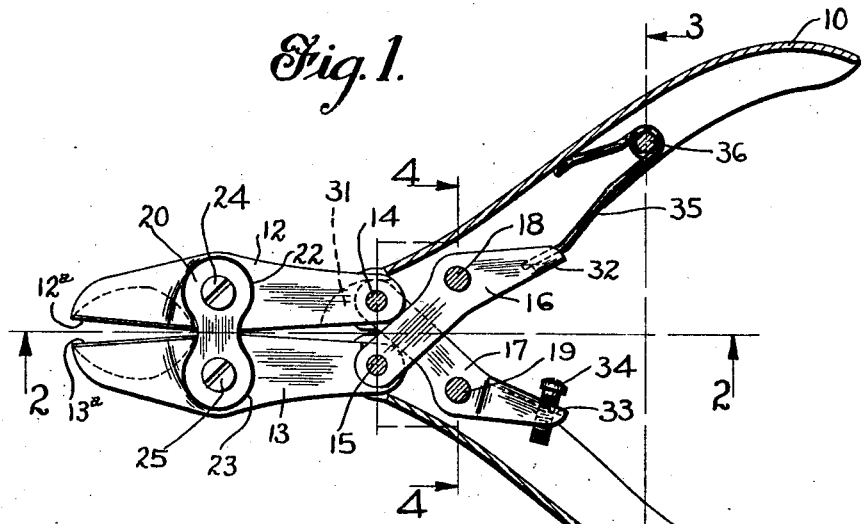
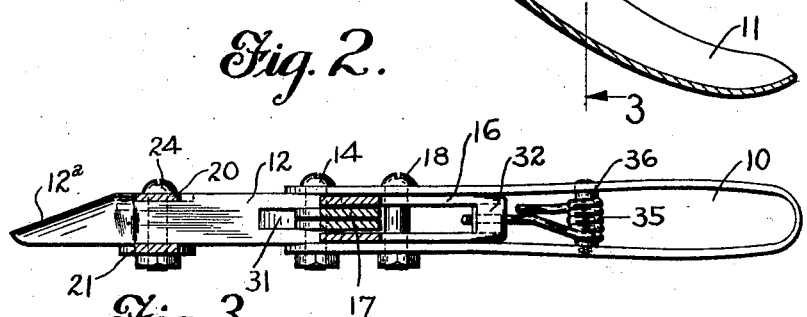
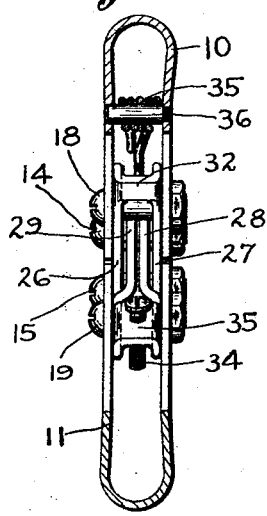
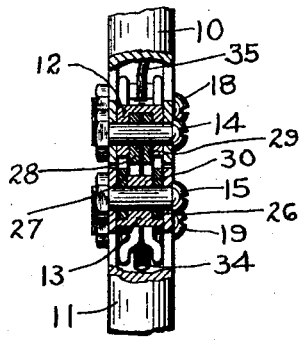
Inventor
William A. Bernard
By Henry E. Rockwell
Attorney

UNITED STATES PATENT OFFICE.

WILLIAM A. BERNARD, OF NEW HAVEN, CONNECTICUT, ASSIGNOR TO THE WILLIAM SCHOLLHORN COMPANY, OF NEW HAVEN, CONNECTICUT.

HAND TOOL.

1,407,780. Specification of Letters Patent. Patented Feb. 28, 1922.

Application filed February 28, 1921. Serial No. 448,305.

*To all whom it may concern:*

Be it known that I, WILLIAM A. BERNARD, a citizen of the United States, residing in New Haven, county of New Haven, State of Connecticut, have invented certain new and useful Improvements in Hand Tools, of which the following is a full, clear, and exact description.

One object of this invention is to provide a new and improved tool in the form of a diagonal cutting nipper.

Another object of the invention is to provide such a tool with a new and improved spring action, which will permit the use of a stronger spring to retain the jaws in open position and will result in the tool having a longer life.

A still further object of the invention is to provide a diagonal cutting nipper of the class described, which shall be constructed of such parts and in such a manner that the durability and efficiency of the tool will be greatly increased.

In the accompanying drawings:

Fig. 1 is a side elevation of a hand tool embodying my invention, the levers being shown in section;

Fig. 2 is a sectional view on line 2—2 of Fig. 1;

Fig. 3 is a sectional view on line 3—3 of Fig. 1; and

Fig. 4 is a sectional view on line 4—4 of Fig. 1.

Referring to the drawings, I have designated lever handles by the numerals 10 and 11, respectively, these lever handles being provided with forward forked portions which receive the rear end portions of the jaws 12 and 13, provided with the diagonal cutting edges 12$^a$ and 13$^a$, respectively, and are pivoted thereto by means of the pivot pins 14 and 15. The levers 10 and 11 are not pivoted to each other, but instead are connected by two strap members 16 and 17, which are pivoted to the respective lever handles by the pins 18 and 19, and are pivoted to the jaws upon the pins 14 and 15. It will be noticed that the strap 17, which is connected with the lever handle 11, is pivoted to opposite jaw 12, while in the same manner the strap 16 pivoted to the lever handle 10 is connected to the jaw 13.

The jaws are connected by a pair of jaw strap members 20 and 21, as shown in Figs. 1 and 2. It will be noted that the strap member 20 is positioned in recesses 22 and 23 in the two jaws, so that the outer surface of the strap will lie approximately flush with the surface of the jaws, while the strap member 21 is merely applied to the surface of the jaws. The two strap members are pivotally secured to the jaws by the bolts 24 and 25, each of which extends through both of the straps and one of the jaws.

It is noted by reference to Figs. 2 and 3, that the strap member 16 is slotted to provide the two side members 26 and 27 between which extend the side members 28 and 29 of the strap member 17, which are pressed together to extend between the side members of the other strap. The forward ends of the side members 26 and 27 receive between them the reduced end portion 30 of the jaw 13, while the rear end of the jaw 12 is recessed, as shown at 31 and receives therein the two side members of the strap 17. The bolts 14 and 15 pass through the forward forked portion of the levers 10 and 11, the rear ends of the jaws 12 and 13 and the forward ends of the strap members 16 and 17, to connect all of these parts together.

The rear ends of the side members of the straps 16 and 17 are bridged by bridge members 32 and 33 and through the member 33 is threaded a screw 34, which may be adjusted to come into contact with the lever handle 11 upon the closing of the nippers to limit the closing movement thereof and relieve the pressure upon the cutting edges of the jaws. A spring 35 is coiled around a pin or screw 36 in the lever 10, one end of which reacts against the inner surface of the lever handle, while the other end engages the bridge member 32 of the strap 16. It will be seen that this spring, being given a tension which will tend to spread the two projecting ends, will tend to keep the lever handles in open position. Particular attention is called to the fact that the spring is mounted toward the end of the handle where it will be out of the way of the working parts of the tool, while at the same time a separate pin may be provided on which the spring is wound so that a larger and stronger spring may be used than is the case in some tools where the same pins are used to support the springs that are used to pivot parts of the tool.

While I have shown and described my invention as applied to a hand tool in the form of a diagonal bladed nipper, it will be apparent that the invention in all of its aspects is not restricted to this particular type of tool, and may be applied to various other tools of the same character. The invention, moreover, is susceptible of many changes and modifications which will lie within the spirit of the invention and within the scope of the appended claims.

What I claim is:

1. In a hand tool, diagonal cutting nippers comprising a pair of operating handles, cutting jaws pivoted thereto and connected near their forward ends, handle straps connected to rear ends of the jaws and to the handles, one of said handle straps being extended beyond its handle connection and a spring mounted in the handle beyond said strap and having one end engaging said strap to urge said handles to open position.

2. In a hand tool, diagonal cutting nippers comprising a pair of operating handles, cutting jaws pivoted thereto and connected near their forward ends, handle straps connected to the rear ends of the jaws and to the handles, and a spring mounted in one of said handles beyond its strap connection and engaging the strap to urge the handles to open position.

3. In a hand tool, diagonal cutting jaws, a pair of operating handles pivoted thereto, a pair of handle straps connected to the jaws, pivot pins to pivotally connect the handle straps to the handles, a third pin mounted in one of the handles, a spring wound around said pin and having one end reacting against the handle, the other end of said spring engaging one of said straps to urge said handles to open position.

4. In a hand tool, side cutting jaws connected near their forward ends, handle members pivoted to the rear ends of said jaws, handle straps connected to the jaws, pivot pins pivotally connecting the handle straps to the handle, a spring pin mounted in one of the handles, one of said straps being extended beyond its pivot pin and toward said spring pin and a spring mounted on said spring pin and engaging the extended portion of said handle strap.

5. In a hand tool, diagonal cutting jaws, a pair of handle members, means connecting the handles to the jaws comprising handle straps, pivot pins pivotally connecting the straps to the handles, and a spring mounted in one of the handles separately from the corresponding strap and engaging said strap to urge the handles to open position.

In witness whereof, I have hereunto set my hand on the 25th day of February, 1921.

WILLIAM A. BERNARD.